United States Patent Office 3,332,908
Patented July 25, 1967

3,332,908
GLYCIDYL ETHERS
Ralph F. Sellers, Somerset, Samuel G. Smith, Jr., Hillsborough Township, and Allison S. Burhans, Bernards Township, N.J., assignors to Union Carbide Corporation, a corporation of New York
No Drawing. Filed Feb. 8, 1965, Ser. No. 431,186
26 Claims. (Cl. 260—47)

This invention relates to glycidyl ethers and to curable compositions and cured products based thereon. More particularly, this invention relates to glycidyl ethers which can be cured to infusible products which are characterized by excellent compressive modulus, excellent compressive yield strength and by relatively high heat distortion temperatures.

The cured products of this invention, by reason of their excellent compressive modulus and excellent compressive yield strength, are highly attractive for use as binders in filament-wound, deep sea submergence vehicles and structural laminates which are to be subjected to high compressive forces. Also, the cured products of this invention, characterized by relatively high heat distortion temperatures, can be advantageously used as binders in structural laminates which are to be exposed to relatively high temperatures over prolonged periods of time.

The present invention provides cured products which are characterized by a compressive modulus (ASTMD–695–61) in excess of about 700,000 p.s.i., a compressive yield strength (ASTMD–695–61) in excess of about 30,000 p.s.i. and a heat distortion temperature (ASTMD–648–56) in excess of about 150° C.

The glycidyl ethers of this invention can be represented structurally by Formulas I–IV which are given below.

Formula I

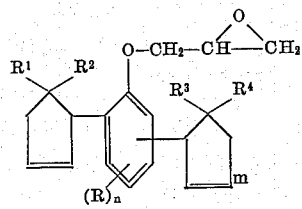

wherein: R is as subsequently defined in Formula VII; $R^1$, $R^2$, $R^3$ and $R^4$, which can be the same or different, are hydrogen or alkyl and when alkyl generally containing 1 to 6 carbon atoms inclusive and preferably containing 1 to 4 carbon atoms inclusive; $m$ is an integer having a value of 0 to 2 inclusive, $n$ is an integer having a value of 0 to 4 inclusive and the maximum value of $m + n$ is 4; and with the further limitation that each cyclopentenyl group is in a position other than meta to the glycidyl ether group.

Formula II

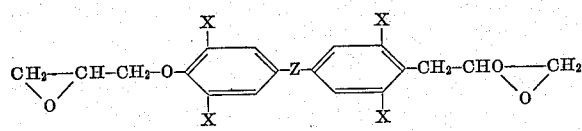

wherein: Z is as subsequently defined in Formula VIII, each X, which can be the same or different, is hydrogen; as defined for R of Formula I or a cyclopentenyl group, i.e.,

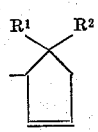

wherein $R^1$ and $R^2$ are as defined in Formula I and with the further limitation that at least one X is a cyclopentenyl group, as described.

Formula III

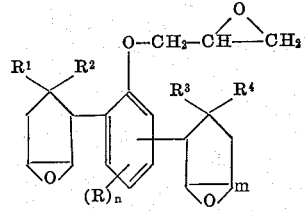

wherein: R through $R^4$, $m$, $n$ and the maximum sum thereof and the position of each cyclopentyl group are as defined in Formula I.

Formula IV

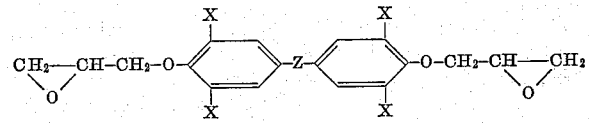

wherein: Z is as defined in Formula II; each X, which can be the same or different, is hydrogen; as defined for R in Formula I, or an epoxidized cyclopentenyl group

wherein $R^1$ and $R^2$ are as defined in Formula I and with the further limitation that at least one X is an epoxidized cyclopentenyl group, as described.

The preparation of compounds falling within the scope of Formula I is conveniently accomplished by reacting an epihalohydrin with a compound falling within the scope of Formula V.

Formula V

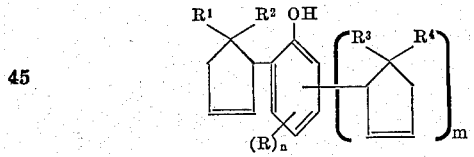

wherein all of the variables are as defined in Formula I.

The reaction of an epihalohydrin with compounds falling within the scope of Formula V can be conducted by reacting a mixture containing these compounds in a manner as described in U.S. Patent 2,943,095 to Alford G. Farnham and also a further described in this specification. In this reaction, each hydrogen of each phenolic hydroxyl group is replaced, theoretically, by a glycidyl radical.

Compounds falling within the scope of Formula V can be conveniently prepared according to the procedure described in British Patent 741,446 and also according to the procedure described in a book by George A. Olah entitled "Friedel-Crafts and Related Reactions," Part I (chapter XV), Interscience Publishers, 1964, by reacting a cyclopentadiene having the formula:

Formula VI

wherein R¹ and R² are as defined in Formula I; with a phenol having the formula:

Formula VII

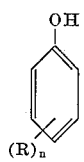

wherein $n$ is an integer having a value of 0 to 4 inclusive, each R, which can be the same or different, is an alkyl radical containing from 1 to 6 carbon atoms inclusive, an alkoxy radical containing from 1 to 6 carbon atoms inclusive, or a halogen, i.e., chlorine, bromine, iodine and fluorine; with the proviso that at least one position ortho to the hydroxyl group is unsubstituted.

Specific phenols falling within the scope of Formula I are: alkylated phenols, exemplary of which are m-cresol, o-ethyl phenol, m-ethyl phenol, p-isopropyl phenol, m-tert-butyl phenol, o-amyl phenol, p-n-hexyl phenol, 2,4-dimethyl phenol, 2,4-di-n-hexyl phenol, 2,3,5-triethyl phenol, 2,3,5-trihexyl phenol, 2,3,4,5-tetra-n-hexyl phenol, and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-n-hexoxy phenol, o-n-hexoxy phenol, p-n-hexoxy phenol, 2,4-dimethoxy phenol, 2,4-di-n-hexoxy phenol, 2,3,5-trimethoxy phenol, 2,3,5-tri-n-hexoxy phenol, 2,3,4,5-tetra-n-hexoxy phenol and the like; halogenated phenols such as ortho, meta or para chloro phenol, ortho, meta or para bromo phenol, 2,4-dichlorophenol and 2,3,5-trichlorophenol and the like.

Compounds falling within the scope of Formula II can be conveniently prepared by reacting a compound falling within the scope of Formula VI with a polyhydric, polynuclear phenol having the formula:

Formula VIII

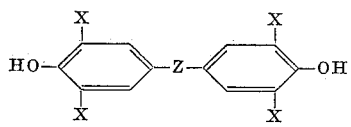

wherein: Z is a divalent radical, as for example, SO₂, S, —S—S—, oxygen, alkylidene, alkylene and the like and each X is hydrogen or as defined for R of Formula I with the further limitation of at least one X is hydrogen. Particularly desirable polynuclear, polyhydric phenols are those wherein the alkylene or alkylidene groups contain a maximum of 6 carbon atoms.

Exemplary of specific polyhydric, polynuclear phenols are the following: bis(hydroxyphenyl)alkanes such as 2,2-bis(p-hydroxyphenyl)propane, commonly referred to as Bisphenol A, bis(4-hydroxyphenyl)methane, 1,1-bis(4-hydroxyphenyl)ethane, 1,2 - bis(4-hydroxyphenyl)ethane, 1,1 - bis(4-hydroxy-2-methylphenyl)ethane, 2,2-bis(2-isopropyl-4-hydroxyphenyl)propane, 2,2-bis(4-hydroxynaphthyl)propane, 2,2-bis(4-hydroxyphenyl)pentane, 3,3-bis(4-hydroxyphenyl)pentane, 2,2-bis(4-hydroxyphenyl)heptane, bis(4 - hydroxyphenyl)phenylmethane, bis(4 - hydroxyphenyl)cyclohexylmethane, 1,2-bis(4-hydroxyphenyl)-1,2-bis(phenyl)propane, 2,2-bis(4-hydroxyphenyl)-1-phenylpropane and the like, dihydroxy biphenyls such as 4,4'-dihydroxybiphenyl and the like; di(hydroxyphenyl) sulfones such as bis(4-hydroxyphenyl)sulfone, 5'-ethyl-4,4'-dihydroxydiphenyl sulfone, 3'-methyl-4,4'-dihydroxydiphenyl sulfone and the like; di(hydroxyphenyl)ethers such as bis(4-hydroxyphenyl)ether and the like.

Compounds falling within the scope of Formula III and Formula IV can be conveniently prepared by epoxidizing compounds falling within the scope of Formula I and Formula II respectively, utilizing peracetic acid, in a manner as described in this specification and also in a manner as described in U.S. Patent 2,750,395 to B. Phillips et al.

Glycidyl ethers of this invention can be cured to infusible products by being heated at elevated temperatures, generally on the order of about 50° C. to about 200° C. Since the self-cure of these glycidyl ethers, at elevated temperatures, requires more than a day, it is customary to add curing agents thereto, prior to the heating cycle, in order to effect a cure in a reasonable period of time. Any of the epoxy curing agents can be used for this purpose. The curing agents can be catalysts, that is, compounds which primarily catalyze the curing reaction, or hardeners, compounds which react with the glycidyl ethers.

Suitable hardeners are the polyamines (described in U.S. Patent 2,935,488; the polycarboxylic acids and anhydrides thereof described in U.S. Patent 2,921,925 to B. Phillips et al.

For purposes of stoichiometric calculations: one epoxy group is deemed to react with one amino hydrogen atom; one epoxy group is deemed to react with one carboxyl group; and one epoxy group is deemed to react with one anhydride group.

Particularly desirable hardeners for purposes of this invention are the aromatic amine hardeners. Cured products of curable compositions containing aromatic amine hardeners have exceptionally high compressive modulus and yield strength as well as relatively high heat distortion temperatures.

Among suitable aromatic amines are those having 2 or more and preferably at least 3 amino hydrogen atoms per molecule, as for example, those having the formula:

Formula IX

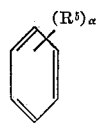

wherein each R⁵, which can be the same or different, is halogen, e.g., chlorine, bromine and the like; primary amino groups; or hydrocarbon radicals, generally containing 1 to 20 carbon atoms inclusive and preferably containing 1 to 10 carbon atoms inclusive and $\alpha$ is a whole number having a value of 1 to 6 inclusive; provided the compound contains 2 or more amino hydrogen atoms per molecule.

Illustrative of hydrocarbon radicals for R⁵ are alkyl radicals, generally containing 1 to 20 carbon atoms inclusive and preferably containing 1 to 10 carbon atoms inclusive, such as methyl, ethyl, n-propyl, isopropyl, n-butyl, n-decyl and the like; cycloalkyl radicals, generally containing 3 to 20 carbon atoms inclusive and preferably containing 3 to 10 carbon atoms inclusive, such as cyclohexyl and the like; unsaturated alicyclic and unsaturated aliphatic hydrocarbon radicals, generally containing from 2 to 20 carbon atoms inclusive and preferably containing 2 to 10 carbon atoms inclusive, such as cyclopentenyl, allyl and the like; halogenated alkyl and cycloalkyl radicals, generally containing 1 to 20 carbon atoms inclusive and preferably containing 1 to 10 carbon atoms inclusive, such as chloroethyl, bromoethyl, fluoroethyl, 2-chloro-n-propyl, 2-bromo-n-propyl, 2-chloro-n-butyl and the like; alkoxy and aryloxy substituted alkyl and cycloalkyl radicals, generally containing 2 to 20 carbon atoms inclusive and preferably containing 2 to 10 carbon atoms inclusive, such as methoxymethyl, ethoxyethyl, 3-ethoxy-n-propyl, 4-ethoxy-n-butyl, 2-methoxycyclohexyl, phenoxymethyl, 2-phenoxyethyl and the like; aryl radicals, generally containing 6 to 20 carbon atoms inclusive and preferably containing 6 to 18 carbon atoms inclusive, such as phenyl, tolyl and the like, as well as halogenated aryl radicals, such as p-chlorophenyl, p-bromophenyl, p-fluorophenyl, p-iodophenyl and the like; alkoxy and aryloxy substituted aryl radicals, generally containing 7 to 20 carbon atoms inclusive and preferably containing 9 to 18 carbon atoms inclusive, such as p-methoxyphenyl, p-ethoxyphenyl, p-n-propoxyphenyl and the like; alkaryl radicals, such as o-methylphenyl, p-ethylphenyl, p-n-propylphenyl, o-n-propylphenyl and the like; also, those hydrocarbon radicals, as described, which are substituted with one or more amino groups.

Exemplary of such aromatic amines are the following: o-phenylenediamine, p-phenylenediamine, m-phenylenediamine, benzidine, o-tolidine, o-dianisidine and the like.

Particularly desirable aromatic amines falling within the scope of Formula IX are those amines having the formula:

Formula X

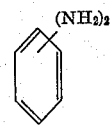

Among other suitable aromatic amines are those having the formula:

Formula XI

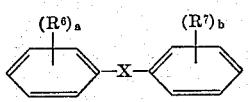

wherein $R^6$ and $R^7$ are as defined for $R^5$, $a$ and $b$ are whole numbers having a value of 1 to 5 inclusive and X is a divalent radical, as for example; —C—, —O—, —S—, —SO—, —SO$_2$—, —S—S, or a divalent hydrocarbon radical, wherein the amine contains at least two primary amino groups per molecule, as described, and these do not necessarily have to be attached to the same aromatic nucleus.

Illustrative of suitable divalent hydrocarbon radicals for X are the following divalent, aliphatic hydrocarbon radicals; alkylene radicals, generally containing 1 to 6 carbon atoms inclusive and preferably containing 1 to 4 carbon atoms inclusive, such as methylene, ethylene, trimethylene and the like; alkylidene radicals, generally containing 2 to 6 carbon atoms inclusive and preferably containing 2 to 4 carbon atoms inclusive, such as ethylidene, propylidene, isopropylidene and the like.

Particularly desirable aromatic amines falling within the scope of Formula XI are those aromatic amines having the formula:

Formula XII

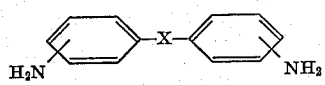

wherein X is sulfone (SO$_2$) or a divalent hydrocarbon radical, as previously described.

Also suitable for purposes of this invention are the aromatic amines produced on reacting aniline with formaldehyde. Specific aromatic amines falling within the scope of Formula XII are the following: 4,4'-diaminodiphenylmethane, 4,4'-diaminodiphenylsulfone, bis(4-amino-2-chlorophenyl)methane and the like.

In those instances in which a hardener is used, it is generally employed in amounts of about 40 percent of stoichiometric to about 60 percent in excess of stoichiometric. As a rule, it is preferred to use about stoichiometric amounts.

Illustrative of suitable catalysts which can be used to initiate the self-cure of the glycidyl ethers of this invention are tertiary amines such as benzyldimethylamine and the like, quaternary ammonium compounds, boron trifluoride complexes such as boron trifluoride etherate complex, boron trifluoride monoethylamine complex and the like, uranyl nitrate, uranyl esters and the like.

In those instances wherein a catalyst is used, it is employed in at least catalytic amounts, that is, amounts sufficient to initiate the self-cure of the glycidyl ethers. Generally the catalyst is used in amounts of from about 0.2 to about 5 percent by weight and preferably from about 0.5 to about 2 percent by weight based on the weight of the glycidyl ether. More than about 5 percent by weight of catalyst can be used but this does not materially decrease the time of the curing cycle and is, therefore, economically undesirable.

The glycidyl ethers of this invention, which contain more than one epoxy group per molecule, can be used in every application now served by epoxides, as for example, in epoxy tooling and abrasive wheel applications, in electrical relays, gears and bearings. Also, the glycidyl ethers can be used in molding and casting applications to form shaped articles of desired form.

Particularly desirable applications of the glycidyl ethers of this invention is in the preparation of laminates and filament-wound structures using aromatic amines as hardening agents. In producing a composition suitable for this purpose, the glycidyl ether in combination with an aromatic amine hardener is dissolved in any suitable organic solvent to form a solution having a solids content of about 30 to about 70 percent by weight. As a rule, the organic solvent used is a ketone, such a methylethyl ketone, diisopropyl ketone and the like. This solution is then used to impregnate, by any suitable method, for example, dipping, spraying and the like any desired material, for instance, glass cloth, glass filaments, carbon cloth, carbon filaments, nylon filaments, metal fibers, paper and the like. The solvent is removed from the impregnated material and the impregnated material is then formed into a desired shape and the composition cured to its infusible state.

The temperature to which each impregnated material is heated in order to effect a cure of the composition will, of coure, vary and depend, in part, upon the exact formulation of the composition. As a rule, this temperature is in the range of about 100° C. to about 200° C. for a period of time ranging from about 1 to 6 hours. In the production of laminates, it is also customary to subject the impregnated material to elevated pressures.

The compounds of this invention, which contain a single epoxide group per molecule

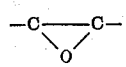

can be used as reactive diluents and as intermediates in the preparation of compounds containing more than one epoxide group per molecule.

The following examples further illustrate the present invention and are not intended to limit the scope thereof in any manner.

*Example 1*

This example illustrates the preparation of a glycidyl ether having the formula:

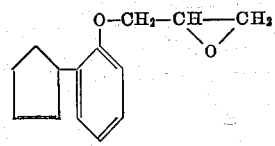

o-(Cyclopentenyl-2)phenylglycidyl ether o-Cyclopentenyl phenol and epichlorohydrin were admixed in an amount of 2360 grams of the phenol and 4110 grams of epichlorohydrin (molar ratio of 4 moles of epichlorohydrin per phenolic hydroxyl equivalent) with 1339 grams of ethyl alcohol. The temperature of the mixture was maintained at 60° C.–65° C. while a 50 percent aqueous solution of sodium hydroxide was added thereto according to the following schedule:

136 grams of aqueous NaOH during the first hour
136 grams of aqueous NaOH during the next half-hour
954 grams of aqueous NaOH during the next hour
136 grams of aqueous NaOH during the next hour The excess epichlorohydrin, alcohol and water were distilled off to conditions of 110° C. at 55 mm. Hg pressure. The organic portion of the residue was dissolved in 3300 grams of methyl isobutyl ketone and the ketone solution was then water washed until free of salts and residual alkali. The glycidyl ether was recovered by distilling off the ketone.

Analysis:
  Yield=3248 grams
  Viscosity=24.4 centistokes
  Epoxy assay=242.9 grams/gram equivalent.

*Example 2*

This example illustrates the preparation of a compound having the formula:

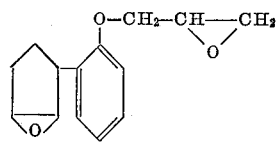

o-(2,3-epoxycyclopentyl)phenylglycidyl ether 0.231 mole of the glycidyl ether of Example 1 was placed in a flask which was fitted with a stirrer and external cooling means and 94 grams of a 23.4 percent solution of peracetic acid in ethyl acetate was added dropwise into the flask over a period of 25 minutes. During the addition and for 2 hours thereafter, the reaction solution was maintained at a temperature of about 35° C. At the end of this period an analysis for peracetic acid indicated that 97.8 percent of the theoretical peracetic acid had been consumed. The reaction solution was then added dropwise to a still kettle containing ethylbenzene which was refluxing under a pressure of 25 mm. Hg. During the addition, enough material was being distilled so that a head temperature of 30° C.–32° C. was maintained. After this addition, a low boiling material was distilled up to the boiling point of pure ethylbenzene. The residue product, which analyzed 0.14 percent acetic acid, was then purified in a molecular still.

Analysis:
  Viscosity=247 centistokes
  Epoxy assay=122.8 grams/gram equivalent.

*Example 3*

Example 1 was repeated using the same reactants and the same equivalent amounts of reactants, with the exception that the phenol used had the formula:

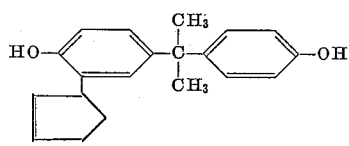

The glycidyl ether produced, m-(cyclopentenyl-2)-2,2-bis(p-glycidyloxphenyl)propane:

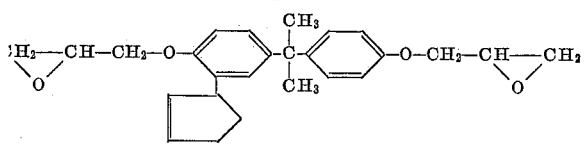

had an epoxy assay of 217 grams/gram equivalent.

*Example 4*

Example 2 was repeated using the glycidyl ether of Example 3.

The product produced, m-(2,3-epoxycyclopentyl)-2,2-bis(p-glycidyloxyphenyl)propane:

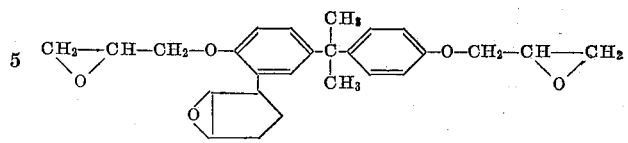

had an epoxy assay of 153 grams/gram equivalent.

Utilizing the procedures set forth in this application, the following compounds were prepared.

*Example 5* o,o-Di-(cyclopentenyl-2)-phenylglycidyl ether

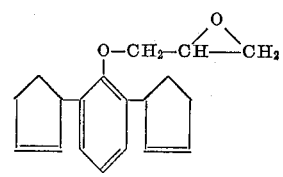

Epoxy assay=318.4 grams/gram equivalent.

*Example 6* o,o,p-Tri-(cyclopentenyl-2)-phenylglycidyl ether

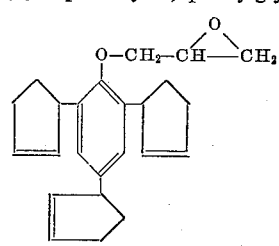

Epoxy assay=362.7 grams/gram equivalent.

*Example 7* o,p-Di-(cyclopentenyl-2)-phenylglycidyl ether

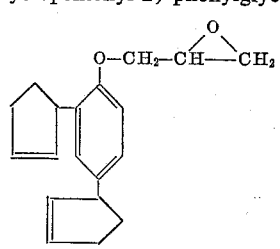

Epoxy assay=317 grams/gram equivalent.

*Example 8* o,o-Di-(2,3-epoxycyclopentyl)phenylglycidyl ether

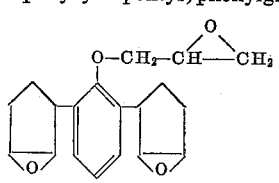

Epoxy assay=101.1 grams/gram equivalent.

*Example 9* o,o,p-Tri-(2,3-epoxycyclopentyl)phenylglycidyl ether

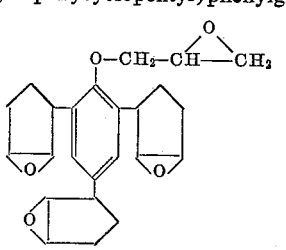

Epoxy assay=110.1 grams/gram equivalent.

*Example 10* o,p-Di-(2,3-epoxycyclopentyl)phenylglycidyl ether

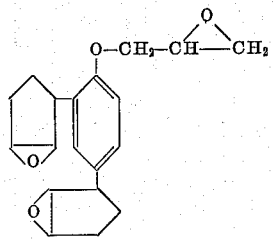

Epoxy assay=100 grams/gram equivalent.

*Example 11*

This example illustrates the excellent properties of the compounds of this invention.

Various compounds, as identified below, were admixed with a stoichiometric amount of m-phenylenediamine in test tubes and formed into rod-like castings ⅝ inch in diameter and 5 inches in length utilizing the following cure cycle:

18 hours at 100° C.
6 hours at 160° C.
2 hours at 200° C.

Cylinders ½ inch in diameter and 1 inch in length were then machined from these castings and subjected to tests which are indicated below.

| Compound | Compressive Modulus, p.s.i. | Compressive Yield Strength, p.s.i. | Heat Distortion Temperature, ° C. |
|---|---|---|---|
| Glycidylether of Example 2 | 763,000 | 32,600 | 157 |
| Glycidylether of Example 8 | 725,000 | 31,000 | 165 |
| Glycidylether of Example 9 | 712,000 | 30,000 | 200 |
| Control | 529,000 | 22,700 | 101 |

The "Control" noted in this example had the formula:

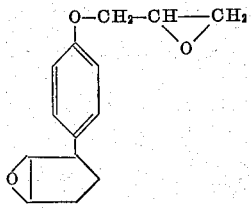

and was prepared by reacting epichlorohydrin with a compound having the formula:

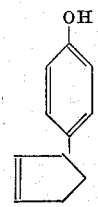

and thereafter epoxidizing this compound using peracetic acid, both reactions being carried out in a manner described in this specification. It is to be understood that the disclosure of all references noted in this application are incorporated herein by reference.

What is claimed is:
1. A glycidyl ether selected from the group consisting of compounds having the formulas:

(a)

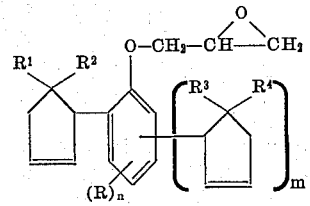

wherein R is selected from the group consisting of alkyl containing 1 to 6 carbon atoms inclusive, alkoxy containing 1 to 6 carbon atoms inclusive and halogen, $R^1$–$R^4$ are selected from the group consisting of hydrogen and alkyl having 1 to 6 carbon atoms inclusive, $m$ is an integer having a value of 0 to 2 inclusive, $n$ is an integer having a value of 0 to 4 inclusive with the maximum value of $m+n$ being 4 and with the further limitation that each cyclopentenyl group is in a position other than meta to the glycidylether group;

(b)

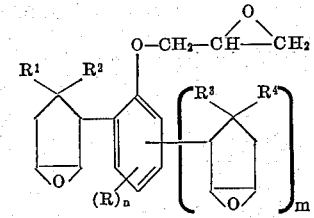

wherein $R$–$R^4$, $n$, $m$, the maximum sum thereof are as defined in (a) and the position of each epoxidized cyclopentyl group is other than meta to the glycidylether group;

(c)

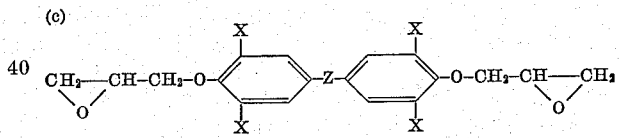

wherein Z is a divalent radical, each X is as selected from the group consisting of hydrogen, groups as defined for R in (a) and cyclopentenyl having the formula:

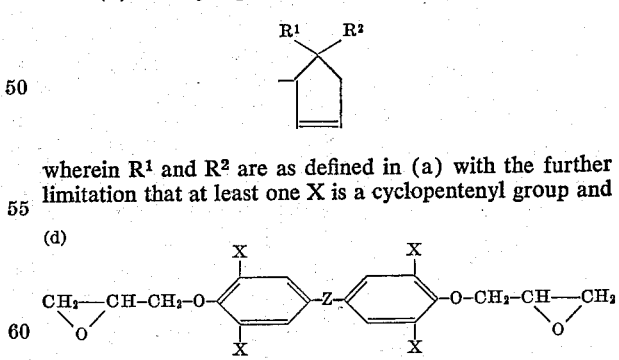

wherein $R^1$ and $R^2$ are as defined in (a) with the further limitation that at least one X is a cyclopentenyl group and (d)

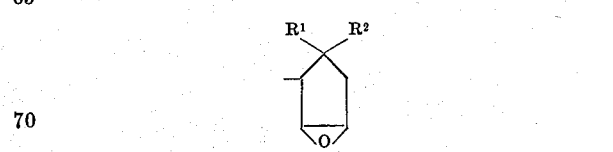

wherein Z is as defined in (c), X is selected from the group consisting of hydrogen, groups as defined for R in (a) and epoxidized cyclopentyl

wherein $R^1$ and $R^2$ are as defined in (a) with the further limitation that at least one X is an epoxidized cyclopentyl group.

2. A glycidylether having the formula:

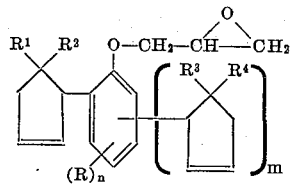

wherein R–R⁴, n, m, the maximum value of m+n and the position of the cyclopentenyl group are as defined in claim 1(a).

3. A glycidylether having the formula:

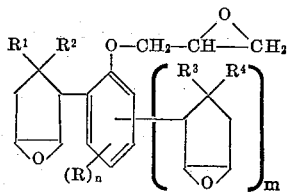

wherein R–R⁴, m, n, the maximum value of m+n and the position of the epoxidized cyclopentyl group are as defined in claim 1(b).

4. A glycidylether having the formula:

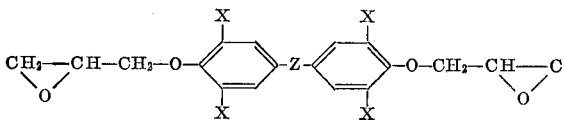

wherein Z and X are as defined in claim 1(c).

5. A glycidylether having the formula:

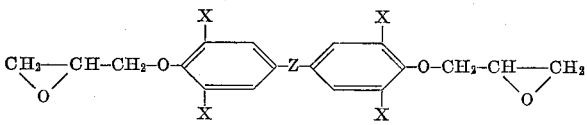

wherein Z and X are as defined in claim 1(d).

6. A glycidylether having the formula:

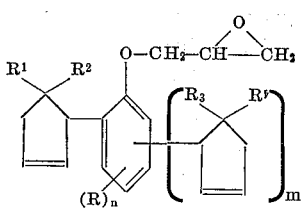

wherein R¹–R⁴ are hydrogen, n is 0 and m has a value of 0 to 2 inclusive and each cyclopentenyl group is in a position other than meta to the glycidylether group.

7. A glycidylether having the formula:

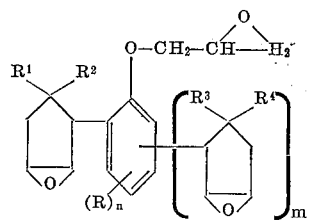

wherein R¹–R⁴ are hydrogen, n is 0, m has a value of 0 to 2 inclusive and each epoxidized cyclopentyl group is in a position other than meta to the glycidylether group.

8. o-(Cyclopentenyl-2)phenylglycidylether.
9. o-(2,3-epoxycyclopentyl)phenylglycidylether.
10. m-(Cyclopentenyl-2)-2,2-bis(p-glycidyloxyphenyl)propane.
11. m-(2,3-epoxycyclopentyl)-2,2-bis - (p-glycidyloxyphenyl)propane.
12. o,o-Di-(cyclopentenyl-2)phenylglycidylether.
13. o,o,p-Tri-(cyclopentenyl-2)phenylglycidylether.
14. o,p-Di-(cyclopentenyl-2)phenylglycidylether.
15. o,o-Di-(2,3-epoxycyclopentyl)phenylglycidylether.
16. o,o,p-Tri - (2,3 - epoxycyclopentyl)phenylglycidylether.
17. o,p - Di - (2,3 - epoxycyclopentyl)phenylglycidylether.
18. The cured product of the glycidylether defined in claim 1(b).
19. The cured product of the glycidylether defined in claim 1(c).
20. The cured product of the glycidylether defined in claim 1(d).
21. A curable composition comprising a curing agent and the glycidylether defined in claim 1(b).
22. A curable composition comprising a curing agent and the glycidylether defined in claim 1(c).
23. A curable composition comprising a curing agent and the glycidylether defined in claim 1(d).
24. A curable composition as defined in claim 21 wherein the curing agent is an aromatic amine having more than 2 amino hydrogen atoms per molecule.
25. A curable composition as defined in claim 22 wherein the curing agent is an aromatic amine having more than 2 amino hydrogen atoms per molecule.
26. A curable composition as defined in claim 23 wherein the curing agent is an aromatic amine having more than 2 amino hydrogen atoms per molecule.

No references cited.

SAMUEL H. BLECH, *Primary Examiner.*
WILLIAM H. SHORT, *Examiner.*
T. D. KERWIN, *Assistant Examiner.*